United States Patent
Carlson et al.

(10) Patent No.: US 7,146,854 B2
(45) Date of Patent: Dec. 12, 2006

(54) METHODS AND APPARATUS FOR MEDIA LEVEL MEASUREMENT

(76) Inventors: Gerard J. Carlson, 4503 S. Riva Ridge Way, Boise, ID (US) 83709; David E. Smith, 1211 S. Plaza Rd., Emmett, ID (US) 83617; Douglas M. Guillory, 1709 N. 18th St., Boise, ID (US) 83702

( * ) Notice: Subject to any disclaimer, the term of this patent is extended or adjusted under 35 U.S.C. 154(b) by 0 days.

(21) Appl. No.: 11/192,702

(22) Filed: Jul. 28, 2005

(65) Prior Publication Data
US 2005/0262938 A1 Dec. 1, 2005

Related U.S. Application Data

(62) Division of application No. 10/730,738, filed on Dec. 8, 2003, now Pat. No. 6,966,222.

(51) Int. Cl.
*G01F 23/00* (2006.01)
*B41J 2/195* (2006.01)
(52) U.S. Cl. .............................. 73/295; 347/7
(58) Field of Classification Search ................. 73/295, 73/904 R; 347/7
See application file for complete search history.

(56) References Cited

U.S. PATENT DOCUMENTS

| | | | | |
|---|---|---|---|---|
| 4,196,625 A | * | 4/1980 | Kern | 73/304 R |
| 4,326,199 A | * | 4/1982 | Tarpley et al. | 340/622 |
| 4,590,797 A | * | 5/1986 | Beaubatie et al. | 73/295 |
| 4,825,383 A | * | 4/1989 | Ory | 702/53 |
| 4,937,598 A | * | 6/1990 | Hine et al. | 347/89 |
| 4,973,993 A | | 11/1990 | Allen | |
| 5,136,305 A | | 8/1992 | Ims | |
| 5,255,019 A | * | 10/1993 | Mochizuki et al. | 347/7 |
| 5,386,224 A | | 1/1995 | Deur et al. | |
| 5,623,291 A | | 4/1997 | Morandotti et al. | |
| 5,685,194 A | * | 11/1997 | McCulloch et al. | 73/295 |
| 5,719,332 A | * | 2/1998 | Wallrafen | 73/295 |
| 5,992,986 A | | 11/1999 | Gyotoku et al. | |
| 5,996,144 A | * | 12/1999 | Hodgetts | 5/81.1 R |

(Continued)

FOREIGN PATENT DOCUMENTS

| JP | 57168117 | 10/1982 |
|---|---|---|
| JP | 02147823 | 6/1990 |
| JP | 03028721 | 2/1991 |

OTHER PUBLICATIONS

Beckwith et al., "Mechanical Measurements," 1982, Addison-Wesley, 3rd Ed., pp. 533-536.*
Holman, "Experimental Methods for Engineers," 1989, McGraw Hill, 5th Ed., pp. 296-299.*

*Primary Examiner*—Hezron Williams
*Assistant Examiner*—John Fitzgerald

(57) ABSTRACT

Representative embodiments provide for a media level measurement apparatus, including a sensor to provide an ambient temperature signal, a controller, and a source configured to provide an electrical current. Also included are a thermistor device configured to provide a level signal corresponding to a level of a media in contact with a lengthwise portion of the thermistor device during an application of the pulse of electrical current, and a signal processor configured to provide a media level signal in accordance with the level signal and the ambient temperature signal. A method includes the steps of supporting a lengthwise portion of a thermistor device in contact with a media, applying an electrical pulse to the thermistor device, sensing a level signal from the thermistor device after a predetermined period of time, and providing a media level signal in corresponding to the level signal.

7 Claims, 7 Drawing Sheets

U.S. PATENT DOCUMENTS

| | | | |
|---|---|---|---|
| 5,997,121 A * | 12/1999 | Altfather et al. | 347/7 |
| 6,007,173 A * | 12/1999 | DeLouise et al. | 347/7 |
| 6,024,429 A | 2/2000 | Coffy et al. | |
| 6,098,457 A * | 8/2000 | Poole | 73/295 |
| 6,142,016 A | 11/2000 | Kobayashi et al. | |
| 6,196,651 B1 * | 3/2001 | Zuber et al. | 347/7 |
| 6,308,564 B1 * | 10/2001 | Wehrmeyer et al. | 73/304 R |
| 6,312,072 B1 | 11/2001 | Hough | |
| 6,443,546 B1 * | 9/2002 | Takagi | 347/7 |
| 6,662,429 B1 * | 12/2003 | Domorazek | 29/593 |
| 6,966,222 B1 * | 11/2005 | Carlson et al. | 73/295 |
| 7,040,729 B1 * | 5/2006 | Richards | 347/7 |

\* cited by examiner

METHODS AND APPARATUS FOR MEDIA LEVEL MEASUREMENT

RELATED APPLICATIONS

The present application is a divisional of, and claims priority under 35 U.S.C. § 120 from, U.S. patent application Ser. No. 10/730,738, "Methods And Apparatus For Media Level B Measurement", filed Dec. 08, 2003, now U.S. Pat. No. 6,966,222 which is incorporated herein by reference in its entirety.

BACKGROUND

Various kinds of imaging apparatuses that form images on sheet media using corresponding imaging media are known. Examples of such imaging media include liquid media or "ink" (in the case of an inkjet printer), dry media or "toner" (in the case of a laser printer), etc. Typically, an imaging media is supported within a reservoir—often in the form of a disposable cartridge—and is progressively consumed during the course of imaging operations. As such, the supply of imaging media within a corresponding imaging apparatus must eventually be replenished (i.e., cartridge replacement, etc.).

As the quantity of imaging media within a reservoir approaches some relatively low level, the quality of the images formed on sheet media by the imaging apparatus can become generally unsatisfactory. Typical examples of such unsatisfactory quality include streaks on the imaged sheet media, voids in the formed image content, etc. Generally, the only solution to these and similar problems is the replenishment of the imaging media within the imaging apparatus.

Because many kinds of imaging apparatus use disposable (or recyclable) cartridge reservoirs to provide the imaging media used therewith, it is typically necessary to have on hand (or timely access to) a new, generally full cartridge reservoir or a bulk supply of imaging media in order to replenish the imaging media with as little inoperative time (i.e., "downtime") of the imaging apparatus as possible. On the other hand, it is generally undesirable to maintain an excessive supply of replacement imaging media or associated cartridges due to the corresponding costs, required storage space, etc.

Therefore, it is desirable to provide methods and apparatus that address the problems described above.

SUMMARY

One embodiment of the present invention provides for a media level measurement apparatus, the apparatus including a sensor configured to provide a temperature signal corresponding to the ambient temperature, and a controller configured to provide a first signal and a second signal. The apparatus also includes a source configured to provide a pulse of electrical current in response to the first signal. Also, the apparatus includes a thermistor device that is electrically coupled to the source and configured to provide a level signal corresponding to a level of a media in contact with a lengthwise portion of the thermistor device during the pulse of electrical current. The apparatus further includes a signal processor. The signal processor is configured to provide a media level signal in accordance with a comparison between the level signal and the temperature signal in response to the second signal.

Another embodiment of the present invention provides for a level measurement apparatus, the apparatus including a microcontroller. The microcontroller includes an executable program code and a plurality of lookup tables, each of the lookup tables including level data. The program code is configured to cause the microcontroller to provide a trigger signal, to sense a level signal at a predetermined time after providing the trigger signal, and to sense an ambient temperature signal. The program code is further configured to cause the processor to cross-reference a particular one of the plurality of lookup tables in correspondence to the ambient temperature signal, to cross-reference particular level data within the particular lookup table corresponding to the level signal, and to provide an imaging media level signal in accordance with the particular data.

Yet another embodiment of the present invention provides for an imaging apparatus, the apparatus configured to form images on a sheet media. The imaging apparatus includes a reservoir configured to support an imaging media, the reservoir defining a depth-wise dimension. The imaging apparatus also includes a thermistor device configured to provide a level signal corresponding to a quantity of an imaging media within a majority of the depth-wise dimension of the reservoir. Also, the imaging apparatus includes a controller coupled in signal communication with the thermistor device. The controller is configured to control at least one operation of the imaging apparatus in accordance with the level signal.

Still another embodiment of the present invention provides a method of measuring a media level. The method includes providing a thermistor device, supporting a lengthwise portion of the thermistor device in contact with the media, and applying an electrical pulse to the thermistor device. The method also includes waiting for a predetermined period of time, sensing a level signal from the thermistor device after the predetermined period of time, and sensing an ambient temperature. The method further includes comparing the ambient temperature to the level signal, and providing a media level signal in response thereto.

These and other aspects and embodiments will now be described in detail with reference to the accompanying drawings, wherein:

DETAILED DESCRIPTION

In representative embodiments, the present teachings provide methods and apparatus for measuring a level or quantity of imaging media within the reservoir of an imaging apparatus. Various embodiments of level sensors that use respective thermistor configurations are provided, with each generally referred to herein as a thermistor level sensor. Each thermistor level sensor defines at least one lengthwise portion that is in contact with the imaging media being measured. Also, suitable embodiments of sensor circuitry are provided that are configured to provide a controlled pulse of electrical current to a corresponding thermistor level sensor during typical measurement operation.

Upon the application of the pulse of electrical current, the thermistor level sensor begins to self-heat, warming to a temperature generally greater than ambient, but generally limited to a temperature less than that at which the measured imaging media would be altered, degraded, or otherwise heat damaged. A portion of the heat energy generated by the thermistor level sensor is then transferred to the contacting imaging media, resulting in an eventual steady-state thermal condition (i.e., temperature) of the thermistor level sensor in accordance with the level or quantity of imaging media in contact therewith.

The sensor circuitry generally, but not necessarily, waits until this steady-state condition is reached and then samples the voltage across the thermistor level sensor for use in deriving a media level signal corresponding to the level (quantity) of imaging media within the reservoir. This media level signal can then be used, for example, to control an imaging apparatus, to provide a user message or alert indicating that media level is low, etc.

Figure 1:
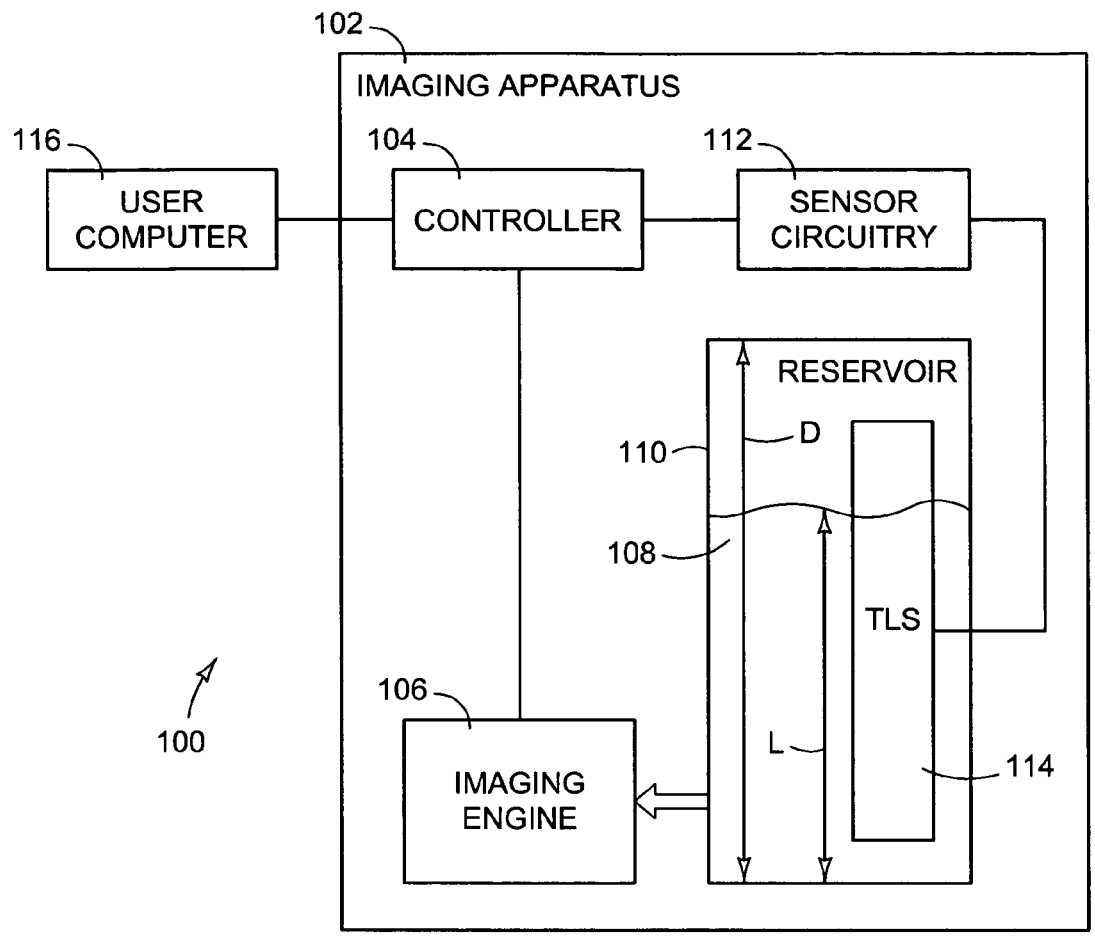
FIG. 1 is a block diagram depicting an imaging system in accordance with one embodiment of the present invention.

Turning now to FIG. 1, a block diagram depicts an imaging system 100 in accordance with one embodiment of the present invention. The imaging system 100 includes an imaging apparatus 102. The imaging apparatus 102 includes a controller 104. The controller 104 is configured to control a number of typical operations of the imaging apparatus 102. As such, the controller 104 can be defined by any electronic controller thus configured. The controller 104 can include, for example: a microprocessor or microcontroller; a state machine; analog, digital and/or hybrid electronic circuitry; electronic memory; input/output circuitry; etc. (not shown, respectively). One of skill in the imaging control arts can appreciate that any number of suitable such controllers 104 can be provided as required and/or desired, and that further elaboration is not required for an understanding of the present invention.

The imaging apparatus 102 also includes an imaging engine 106 coupled in controlled relationship with the controller 104. The imaging engine 106 is generally configured to form images on sheet media (not shown) under the corresponding signal control of the controller 104. Non-limiting examples of the imaging engine 106 include an inkjet imaging engine, a laser imaging engine, etc. Other types of imaging engine 106 can also be used. In any case, the imaging engine 106 forms images through the controlled application of a suitable imaging media 108 (described hereafter) to sheet media (not shown).

The imaging apparatus 102 also includes an imaging media reservoir (hereafter, reservoir) 110. The reservoir 110 is generally configured to support a quantity of imaging media 108 (introduced above) in deliverable communication with the imaging engine 106. In one embodiment, the reservoir 110 is configured to generally define a selectively installable and removable (i.e., disposable or recyclable) cartridge. In another embodiment, the reservoir 110 generally defines a permanent, refillable fixture within the imaging apparatus 102. Other embodiments (not shown) of the reservoir 110 can also be used.

In any case, the reservoir 110 generally defines a depth-wise dimension "D" such that the imaging media 108 is considered to occupy a level "L" within the depth-wise dimension D of the reservoir 110. As the imaging media 108 is consumed during the course of normal operation of the imaging apparatus 102 (described in detail hereafter), the level L of the imaging media 108 within the reservoir 110 drops correspondingly.

The imaging apparatus 102 further includes a sensor circuitry 112 and a thermistor level sensor (hereafter, "TLS") 114. The sensor circuitry 112 is coupled in signal communication with the controller 104, and is electrically coupled to the TLS 114. The sensor circuitry 112 can include any suitable such circuitry in accordance with the present invention.

The TLS 114 is typically supported within the reservoir 110 such that a lengthwise portion of the TLS 114 is in contact with the level L of the imaging media 108. The TLS 114 is generally configured to provide an electrical resistance that is measured (i.e., sensed, or detected) as a corresponding voltage drop in accordance with the level L of the imaging media 108 that is in contact with the lengthwise portion of the TLS 114, in response to an applied pulse of electrical current provided by the sensor circuitry 112. In this way the TLS 114 is configured to provide a signal corresponding to the level or quantity of imaging media 108 present within the reservoir 110. Further elaboration of the TLS 114 and the corresponding level signal is provided hereafter in regard to the typical operation of the imaging system 100.

The imaging system 100 can further include a user computer 116. The user computer 116 can be coupled in signal and data communication with the controller 104 of the imaging apparatus 102. The user computer 116 can include any suitable such computer generally configured to selectively generate and/or provide an electronic document file (not shown) to the imaging apparatus 102 for imaging on sheet media (not shown). Furthermore, the user computer 116 is typically configured to receive various status signals or messages from the controller 104 regarding the state or conditions within the imaging apparatus 102 including, in some embodiments, messages corresponding to the level L of the imaging media 108 within the reservoir 110.

Figure 2:
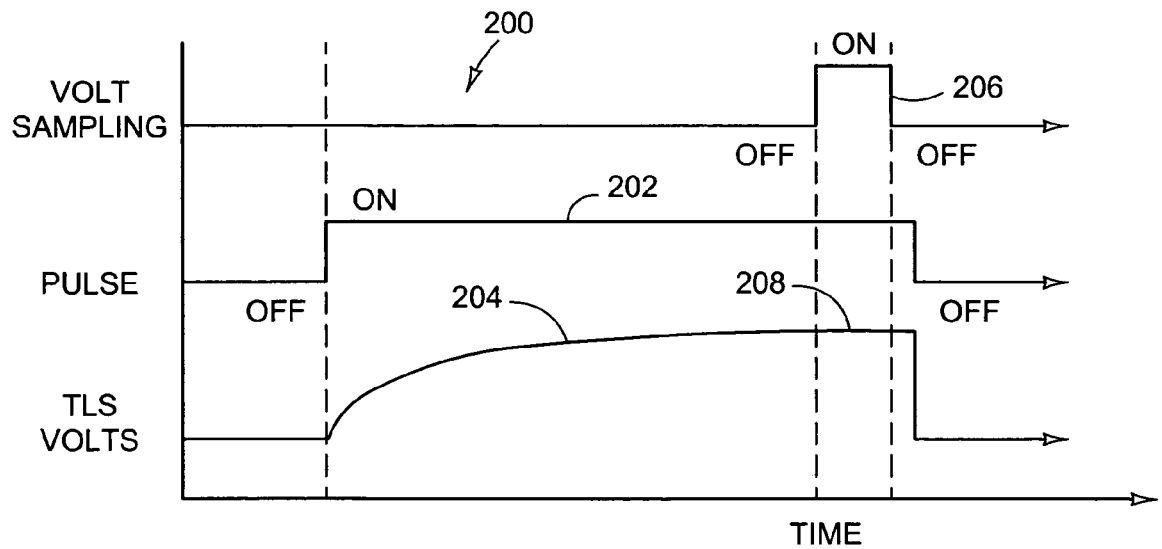
FIG. 2 is a signal timing diagram of the imaging system of FIG. 1.

FIG. 2 is a signal timing diagram 200 in accordance with the imaging system 100 of FIG. 1. Reference is now made to FIGS. 1 and 2 as described hereafter.

Typical exemplary operation of the imaging system 100 (FIG. 1) is as follows: the user computer 116 communicates an electronic document file (i.e., print job) to the controller 104 of the imaging apparatus 102. The controller 104 then requests that the sensor circuitry 112—in cooperation with the TLS 114—provide a media level signal corresponding to the quantity of imaging media 108 within the reservoir 110.

In response to this request, the sensor circuitry 112 (FIG. 1) electrically energizes the TLS 114 using a predefined pulse of electrical current 202 (FIG. 2). The TLS 114 (FIG. 1) begins to self-heat in response to the applied electrical pulse 202 (FIG. 2). A portion of this heat energy is thermally transferred to that quantity (i.e., level L) of the imaging media 108 (FIG. 1) that is in contact with the lengthwise portion of the TLS 114. In turn, the TLS 114 provides an electrical resistance corresponding to the degree (magnitude) of self-heating that occurs as a function of the level L of imaging media 108 in contact therewith.

Typically, the TLS 114 (FIG. 1) defines a positive temperature coefficient such that a greater level L of imaging media 108 in contact with the TLS 114 corresponds to a lesser degree of self heating of the TLS 114, in turn resulting in a lesser electrical resistance of the TLS 114. This electrical resistance of the TLS 114 is detected as a directly proportional voltage 204 (FIG. 2) across the TLS 114 (FIG. 1) by the sensor circuitry 112. The voltage 204 (FIG. 2) across the TLS 114 (FIG. 1) is generally referred to herein as a level signal. To clarify, a decreasing level L of the imaging media 108 typically corresponds to an increasing level signal provided by (i.e., voltage 204 across) the TLS 114.

The sensor circuitry 112 (FIG. 1) then waits until a latter portion of the applied electrical pulse 202 (FIG. 2) and then senses the level signal 204 at a value 208 provided by the TLS 114 (FIG. 1). As depicted in FIG. 2, this sensing, or volt sampling, occurs during (i.e., in response to) the assertion of a sampling signal 206 provided by the sensing circuitry 112 (FIG. 1). In this way, the level signal 204 (FIG. 2) provided by the TLS 114 (FIG. 1) is sampled at or before a substantially steady-state value 208 (FIG. 2) in accordance with the nature of the self-heating of the TLS 114 (FIG. 1), the transfer of energy to the imaging media 108, the ambient temperature, and other related factors.

After sensing the level signal 204 (FIG. 2) of the TLS 114 (FIG. 1), the sensor circuitry 112 then compares the value 208 (FIG. 2) with the ambient temperature adjacent or within the reservoir 110 (FIG. 1), as sensed by a discrete temperature sensor (not shown). The precise nature of the comparison varies from one embodiment of the sensor circuitry 112. In another embodiment, for example, the sensor circuitry 112 uses the level signal directly without comparison to an ambient temperature. A number of various such embodiments and their methods of comparison in accordance with the present invention are described in detail hereafter.

In any event, the sensor circuitry 112 (FIG. 1) then provides a media level signal (i.e., measurement) to the controller 104. For purposes of example, it is assumed that the media level signal indicates a quantity of media 108 suitable to begin imaging the print job. Next, the controller 104 causes the imaging engine 106 to form images on sheet media (not shown), one sheet at a time, in accordance with the content of the print job.

While the imaging operation is in progress, the level of the imaging media 108 (FIG. 1) within the reservoir 110 drops (i.e., decreases) in correspondence to the consumption of the imaging media 108 by the imaging engine 106. Also during the imaging operation, the controller 104 is assumed to poll the sensor circuitry 112 to provide a sequence of updated media level signals corresponding to the instantaneous quantity of the imaging media 108 within the reservoir 110.

For ongoing purposes of example, it is further assumed that at some point in the present print job the level L of the imaging media 108 drops to a predefined, relatively low level within the reservoir 110. The sensor circuitry 112 detects this occurrence by way of the TLS 114, and provides a media level signal to the controller 104 in accordance therewith. The controller 104 then alerts a user to the low level L of imaging media 108 by way of a suitable message communicated to the user computer 116. Such a message can include, for example, a measurement of the remaining imaging media 108 in terms of percentage full, an estimate of the number of sheets still imageable therewith, etc.

The pending print job is now completed, with a user of the user computer 116 put on notice that the imaging media 108 within the imaging apparatus 102 will require replenishment so as to continue any appreciable amount of use. Once again referring to FIG. 2, the electrical pulse 202 and the sampling signal 206 are referred to as first and second signals, respectively, for purposes herein.

Thus, the imaging system 100 is usable to form images on sheet media, while also tracking the level L of imaging media 108 within the reservoir 110. In this way, the controller 104 of the imaging system 100 can use the media level signal provided by the sensor circuitry 112 and the TLS 114 for a variety of purposes such as, for example: automatically halting sheet media imaging in the event that the sensed level L of the imaging media 108 is likely to result in undesirable image quality (e.g., streaks, voids, etc.); to alert a user to generally low level of the imaging media 108; to simply provide a level measurement message to a user of the user computer 116 in response to a user request for such a measurement; predict a future outage of imaging media 108; to provide a prediction of the number of sheet media pages still satisfactorily image-able by the remaining imaging media 108; etc.

Other suitable uses for the media level signal provided by the sensor circuitry 112, in conjunction with the TLS 114, can also be provided. In any case, the TLS 114 and the sensor circuitry 112 of the present invention substantially resolve the problems described above in regard to the undesirable imaging quality resulting from a relatively low level of imaging media within an imaging apparatus, while simultaneously providing the option to predict a need to replenish the imaging media supply (i.e., replace a cartridge reservoir). In this way, the instant invention generally eliminates undesirable imaging results and imaging apparatus downtime due to lack of imaging media, while substantially preventing the need to keep excessive imaging media on hand.

In the typical exemplary operation of the imaging system 100 described above, the quantity of the imaging media 108 is generally detected during heating of the TLS 114. However, it is to be understood that in another embodiment (not shown), the quantity of the imaging media 108 can be generally determined during cooling of the TLS 114 (i.e., after the electrical pulse 202 is terminated) from its electrically heated condition back toward ambient temperature. In such an embodiment (not shown), the rate at which the electrical resistance of the TLS 114 changes during cooling is substantially indicative of the level L of the imaging media 108 within the reservoir 110, and is detected by the associated sensor circuitry 112 for use in providing a corresponding media level signal to the controller 104.

Figure 3:
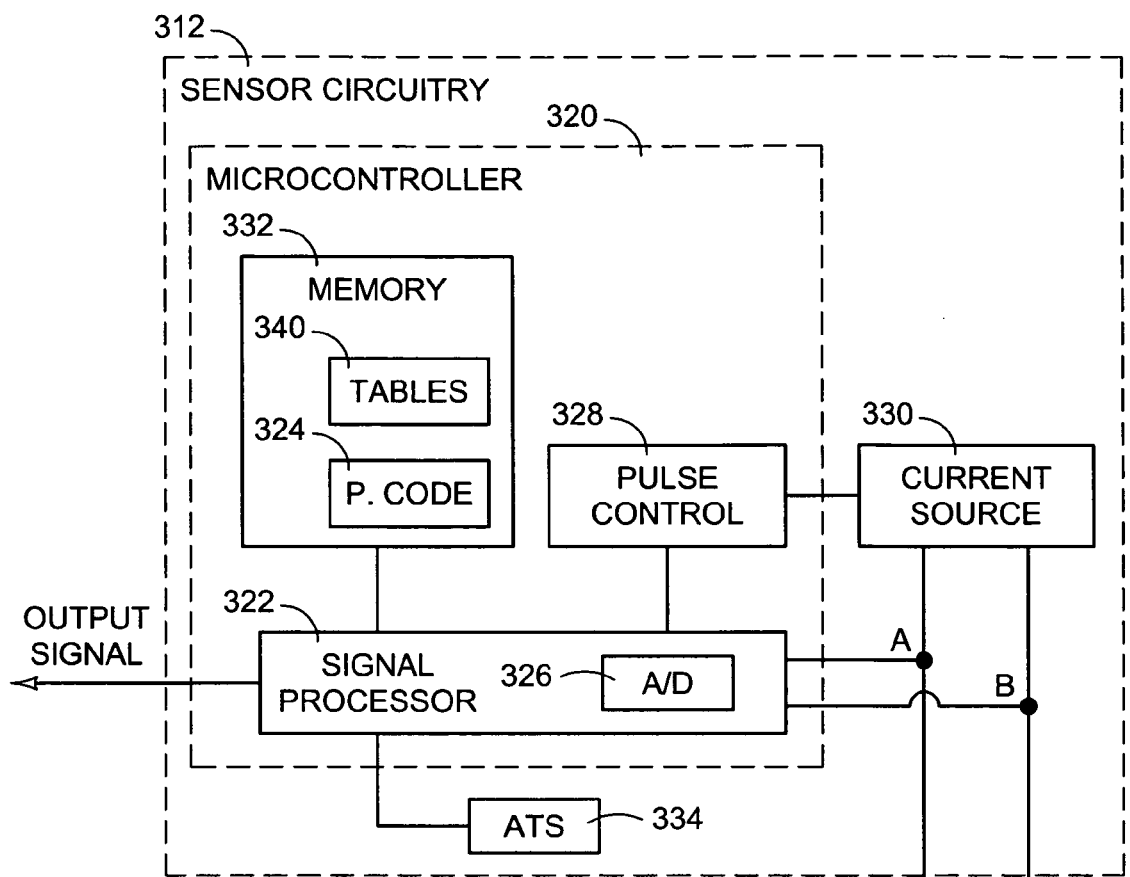
FIG. 3 is a block diagram depicting sensor circuitry in accordance with another embodiment of the present invention.

FIG. 3 is a block diagram depicting a sensor circuitry 312 in accordance with another embodiment of the present invention. The sensor circuitry 312 includes a microcontroller 320. The microcontroller 320 includes a signal processor 322. The signal processor 322 can be defined by any suitable processor configured to control normal operations of the sensor circuitry 312 consistent with the present invention, and in accordance with an executable program code 324 (described in detail hereafter). As such, one of skill in the embedded control arts can appreciate that a number of different suitable microcontrollers 320 can be used.

The signal processor 322 includes an analog-to-digital (hereafter, A-D) converter 326. The A-D converter 326 is generally configured to convert analog signals (i.e., voltage signals continuous over a range) to a suitable binary-bit format for use by the signal processor 322. Typically, the A-D converter 326 is a standard element of the microcontroller 320 and is therefore inherently compatible with the signal processor 322.

The microcontroller 320 also includes a pulse control 328. The pulse control 328 is coupled in controlled relationship with the signal processor 322 and is generally configured to selectively control a current source 330 (described in detail hereafter) in accordance with control signals provided by the signal processor 322. In one embodiment (not shown) the pulse control 328 is considered to be a portion of the signal processor 322. Other embodiments of the pulse control 328 can also be used. In any case, the pulse control 328 includes any suitable electronic circuitry necessary for controlling the current source 330. Non-limiting examples of such pulse control 328 circuitry include transistor switches, switching diodes, timing electronics, analog and/or digital circuitry, etc. For purposes herein, the pulse control 328 can be generally considered to serve as an interface device between the signal processor 322 and the current source 330.

The sensor circuitry 312 further includes the current source 330 introduced above. The current source 330 is coupled in controlled relationship with the signal processor 322 by way of the pulse control 328. The current source 330 is configured to selectively provide a pulse of electrical current to an electrically coupled thermistor level sensor (hereafter, TLS) 314 in response to a pulse control signal provided of the pulse control 328. It is to be understood that the TLS 314 is generally equivalent to the TLS 114 described above in regard to the imaging system 100 of FIG. 1—that is, the TLS 314 can be generally defined by any suitable thermistor level sensor in accordance with the present invention.

The microcontroller 320 of the sensor circuitry 312 further includes a computer-accessible storage device (hereafter, memory) 332. The memory 332 is coupled in data communication with the signal processor 322, and is typically an inherent element of the microcontroller 320. The memory 332 is accessible by the signal processor 322 for purposes of selectively storing and retrieving various kinds of data therein. The memory 332 includes the executable program code (hereafter, program code) 324 introduced above. The program code 324 is configured to cause the signal processor 322 to control various normal operations of the sensor circuitry 312 in accordance with the present invention. Typical such operations are described in detail hereafter.

The memory 332 can include a plurality of lookup tables 340. Each of the lookup tables 340 can be selectively accessible by the signal processor 322, and can include media level data corresponding to level signals provided by the TLS 314. The lookup tables 340 are described in further detail hereafter in regard to FIG. 4.

The sensor circuitry 312 as depicted also includes an ambient temperature sensor (hereafter, ATS) 334 coupled in signal communication with the signal processor 322. The ATS 334 is generally configured to provide a temperature signal corresponding to the ambient temperature in the relative near vicinity of the TLS 314. The ATS 334 can be defined by any suitable temperature sensor. In one embodiment, the ATS 334 and the TLS 314 are selected such that both have substantially equivalent temperature coefficients (i.e., voltage or electrical resistance versus temperature responses). Other embodiment of ATS 334 can also be used.

Figure 4:
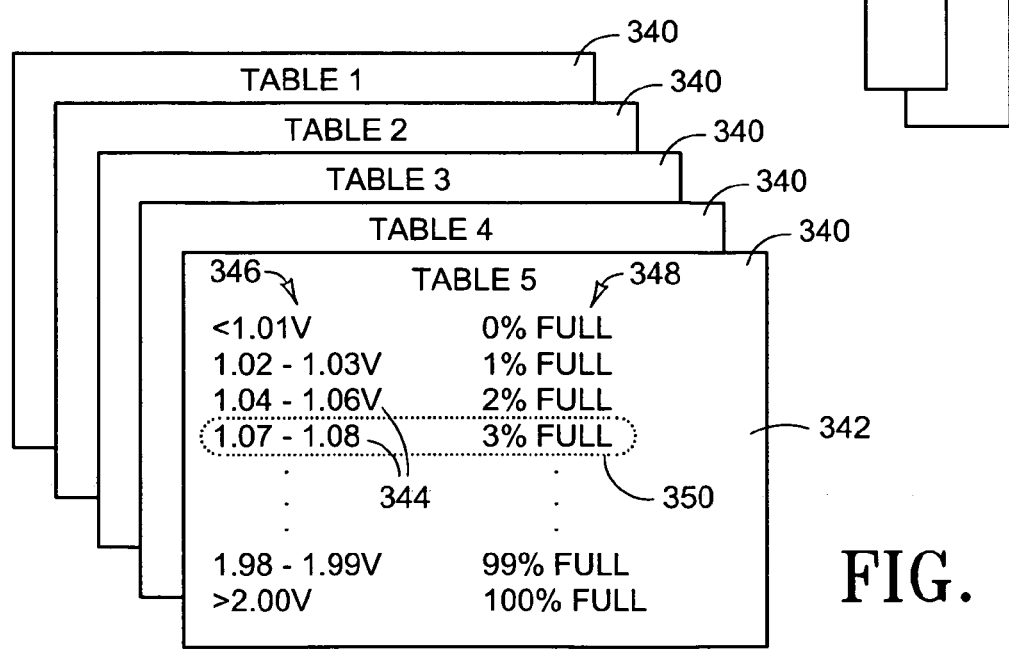
FIG. 4 is block diagram depicting a plurality of lookup tables of the sensor circuitry of FIG. 3.

FIG. 4 is a block diagram depicting the plurality of lookup tables 340 introduced above in regard to the sensor circuitry 312 of FIG. 3. Each of the plurality of lookup tables 340 is typified by the exemplary lookup table 342. The exemplary lookup table 342 includes a number of data rows, or records, 344. Each data record 344 includes a range of signal voltage data 346 and a corresponding quantity or level data 348. The signal voltage data 346 represents a voltage signal provided by the TLS 314 (FIG. 3), while the level data 348 represents the quantity or "percent full" of a reservoir of imaging media (such as the reservoir 110 of FIG. 1) being measured by the associated TLS 314.

Furthermore, each of the lookup tables 340 corresponds to a range of ambient temperatures as sensed by the ATS 334 of FIG. 3. In this way, a lookup table 340 is selected in accordance with a temperature signal provided by the ATS 334, and thereafter a particular record 344 is selected within the selected lookup table 340 in accordance with the level signal data provided by the TLS 314.

It is to be understood the other embodiments of the lookup tables 340 corresponding to other embodiments of the sensor circuitry 312 of FIG. 3 can also be used. For example, other data related to an estimated number of "imaged sheets remaining" can also be included. Other useful data can, of course, be included within the lookup tables 340 as desired.

Reference is now made to FIGS. 3 and 4 as directed hereafter. Typical operation of the sensor circuitry 312 (FIG. 3) is as follows: to begin, it is assumed that the TLS 314 is in lengthwise contact with an imaging media of an imaging apparatus (not shown; see the reservoir 110 of imaging media 108 of FIG. 1) and that the signal processor 322 receives a request for a media level signal or measurement (e.g., the controller 104 of FIG. 1).

In response to the request, the signal processor 322, under the control of the program code 324, signals the current source 330—by way of the pulse control 328—to provide a substantially constant-magnitude flow of electrical current to the TLS 314, thus defining the beginning of an electrical pulse. For purposes herein, this signaling of the current source 330 by the signal processor 322 is considered a first signal. The signal processor 322 then waits for a predefined period of time during a first portion of the electrical pulse applied to the TLS 314.

The TLS 314 (FIG. 3) self-heats in response to the applied electrical pulse from the current source 330, and transfers some portion of this heat energy to imaging media in contact with the TLS 314. As a result, a general rise in voltage occurs across the TLS 314 as depicted in FIG. 3 as nodes "A" and "B". This voltage signal, or level signal, eventually reaches a generally constant, steady-state value in accordance with the level of imaging media (e.g., imaging media 108) in contact with the TLS 314. The level signal is electrically coupled to the signal processor 322 by way of suitable coupling therewith.

At this time, during a predefined later portion of the electrical pulse provided by the current source 330 (FIG. 3), the signal processor 322 causes the A-D converter 326 to sample the level signal at nodes A and B, and to provide a digital equivalent (i.e., "digitization") of the detected level signal. For purpose herein, this signaling of the A-D converter 326 is considered a second signal.

Once the level signal is sampled and "digitized", the signal processor instructs the A-D converter 326 (FIG. 3) to sample and digitize the ambient temperature signal as provided by the ATS 334. Thereafter, the signal processor 322 accesses the plurality of lookup tables 340 within the memory 332. The signal processor 322 then uses the ambient temperature signal to select one of the lookup tables 340 (FIG. 4), and thereafter selects a record 344 within the selected lookup table 340.

For purposes of example, it is assumed that the ambient temperature was such that the exemplary lookup table 342 (FIG. 4) was selected, and that the level signal as provided by the TLS 314 (FIG. 3) was equal to 1.07 volts. The signal processor 322 (FIG. 3) then selects a record 350 (FIG. 4) within the exemplary 342, as the level signal of 1.07 volts is within the range of the signal voltage data 346 for the record 350. By cross reference within the record 350, the signal processor 322 (FIG. 3) reads the associated level data 348 (FIG. 4) within the record 350. From this data 348, the signal processor 322 (FIG. 3) determines that the reservoir sensed by the TLS 314 is approximately 3% full of imaging media.

As such, the signal processor 322 (FIG. 3) then provides a corresponding signal, or message, to the requesting controller (i.e., the controller 104) indicative of the determined (i.e., sensed, or measured) 3%-of-full quantity of imaging media.

At a predefined, relatively short time after the first signal, the signal processor 322 (FIG. 3) causes the current source 330 to halt the present application of electrical current to the TLS 314, thus ending the present electrical pulse. In response, the TLS 314 is assumed to begin cooling towards ambient temperature. A signal measurement operation (iteration) of the sensor circuitry 312 and associated TLS 314 is now considered complete.

Thus, the sensor circuitry 312 and the TLS 314 of FIG. 3 generally provide for the measurement of the present quantity of an imaging media (e.g., imaging media 108 of FIG. 1) within an imaging apparatus and a level signal (i.e., message) corresponding thereto. As depicted in FIG. 3, a relative bulk of the functions performed by the sensor circuitry 312 are provided by way of the microcontroller 320 in conjunction with the program code 324. It is to be understood that other embodiments of the sensor circuitry 312 (not shown) can also be provided that do not include the microcontroller 320.

Under such an embodiment (not shown) of sensor circuitry 312, the signal processor 322, the A-D converter 326, the memory 332 (and the associated program code 324 and lookup tables 340), and the pulse control 328 are respectively defined by suitable electronic circuits and/or devices. In such an embodiment, the pulse control 328 can include timing circuitry used to coordinate the normal operations of the sensor circuitry 312—thus, the pulse control 328 can be generally considered to function as a master controller. Other embodiments (not shown) of the sensor circuitry 312 that are generally consistent with normal operations described above in regard to the sensor circuitry 312 of FIG. 3 can also be used.

In yet another embodiment (not shown) of the present invention, sensor circuitry 312 can be provided that compares the level signal from the TLS 314 with the temperature signal provided by the ATS 334, and thereafter provides a media level signal in accordance with a comparison (such as, for example, by subtracting the temperature signal from the level signal within the analog signal domain, etc.) of these respective signals, prior to other possible signal processing operations (such as, for example, formatting the media level signal, etc.)

In such an embodiment (not shown), for example, the sensor circuitry 312 can be defined so as to not include the A-D converter 326 or the memory 332 (or its associated program code 324 or lookup tables 340). Such an embodiment (not shown) of the sensor circuitry 312 can include, for example: predominantly analog, digital, and/or hybrid circuitry; a state machine; an application-specific integrated circuit (ASIC); etc. Other embodiments (not shown) of the sensor circuitry 312 can also be used.

Figure 5:
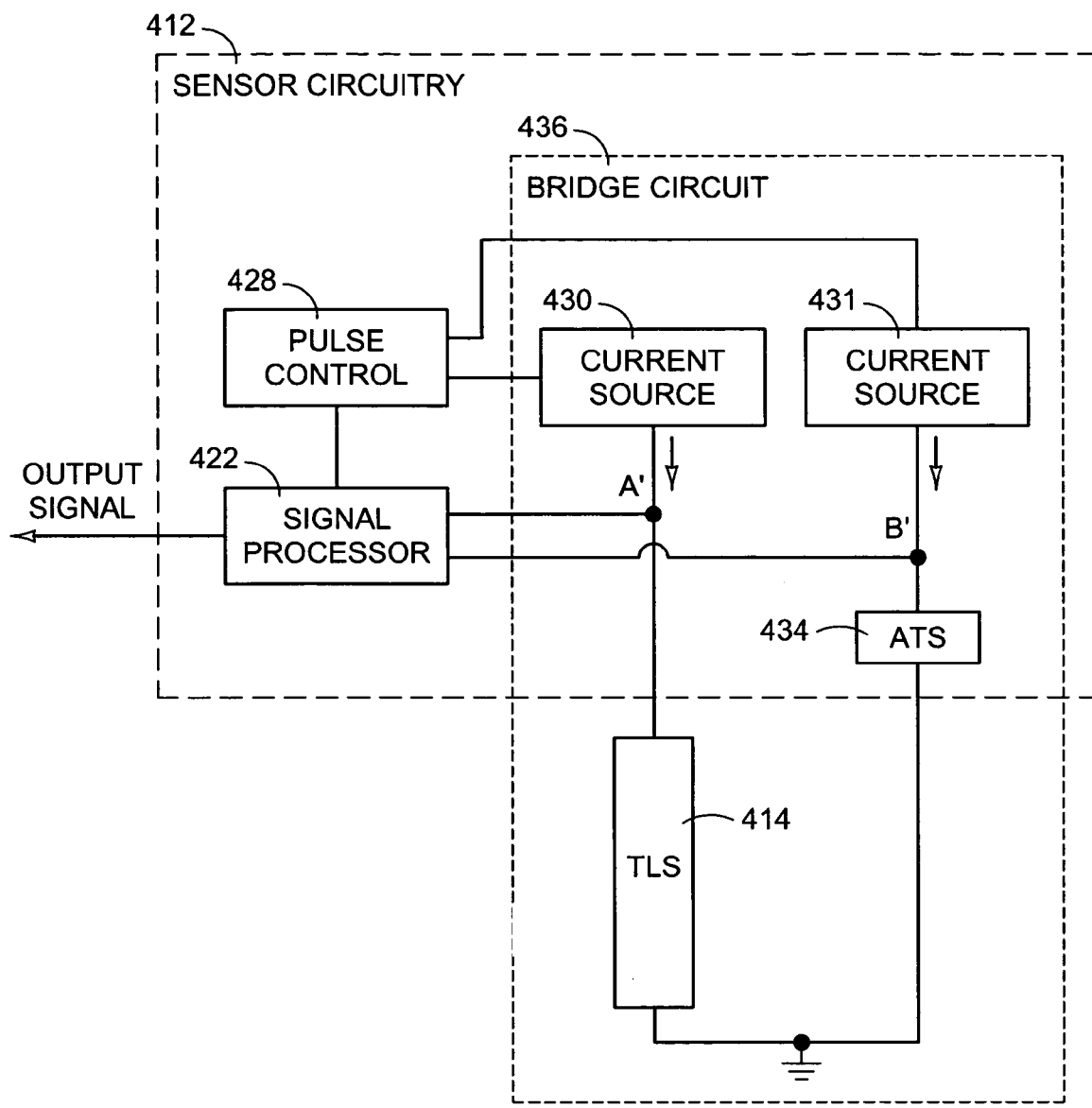
FIG. 5 is a block diagram depicting sensor circuitry in accordance with yet another embodiment of the present invention.

FIG. 5 is a block diagram depicting a sensor circuitry 412 in accordance with yet another embodiment of the present invention. The sensor circuitry 412 includes a signal processor 422. The signal processor 422 is generally configured to process and compare signals corresponding to detected (i.e., sensed) level an d temperature signals coupled to the signal processor 422. The signal processor 422 can include any suitable electronic circuitry as required to perform the various normal operations associated therewith and as described in detail hereafter.

The sensor circuitry 412 also includes a pulse control 428 coupled in controlling relationship with the signal processor 422. The pulse control 428 is generally configured to control (i.e., coordinate) various normal operations of the sensor circuitry 412. The pulse control 428 can include, for example: digital, analog, or hybrid circuitry; timing electronics; dedicated-purpose integrated circuits; etc. In general, the pulse control 428 can be defined by any electronic circuitry suitable for controlling the sensor circuitry 412.

The sensor circuitry 412 also includes first current source 430 and a second current source 431. The first and second current sources 430 and 431 are configured to provide substantially equal pulses of electrical current in response to a trigger signal (i.e., first signal) issued by the pulse control 428. The first current source 430 and the second current source 431 can include any suitable electrical or electronic circuitry as required, respectively.

As depicted in FIG. 5, a thermistor level sensor (hereafter, TLS) 414 is electrically coupled to the first current source 430. The TLS 414 is generally configured to provide a level signal (i.e., voltage signal) corresponding to a level of an imaging media (see the imaging media 108 of FIG. 1) in contact with a lengthwise portion of the TLS 414 in response to the pulse of electrical current provided by the first current source 430. Thus, the TLS 414 can be generally defined by any suitable thermal level sensor of the present invention.

The sensor circuitry 412 also includes an ambient temperature sensor (hereafter, ATS) 434. The ATS 434 is electrically coupled to the second current source 431. The ATS 434 is configured to provide a temperature (or reference) signal generally corresponding to the ambient temperature about the ATS 434. Typically, the ATS 434 is supported in relatively near, spaced adjacency to the TLS 414 such that the ambient temperature exposed to the ATS 434 is substantially common to the two during periods of non-energized operation. Typically, the ATS 434 and the TLS 414 are selected such that they have a common temperature coefficient. In one embodiment, the ATS 434 and the TLS 414 are substantially equivalent entities. Other embodiments can also be used.

It is to be not ed that the first current source 430, the second current source 431, the TLS 414 and the ATS 434 are mutually electrically coupled such that a bridge circuit 436 is defined. The signal processor 422 is electrically coupled to the bridge circuit 436 at nodes "A'" and "B'", respectively. In this way, the signal processor 422 is coupled to the bridge circuit 436 so as to detect the difference signal, or voltage, representative of the difference between the level signal provided by the TLS 414 and the temperature signal provide by the ATS 434.

Typical operation of the sensor circuitry 412 is as follows: to begin, it is assumed that the TLS 414 is supported such that a level of an imaging media is in contact with a lengthwise portion of the TLS 414 (see, for example, the TLS 114 in contact with the imaging media 108 of FIG. 1).

The pulse control 428 then receives a signal requesting a media level signal corresponding to the level of the imaging media (not shown) in contact with the TLS 414. In response the, the pulse control 428 issues a first signal to the first and second current sources 430 and 431 to provide a predefined pulse of electrical current to the TLS 414 and the ATS 434, respectively.

In response to the respectively applied pulses of electrical current, the TLS 414 and the ATS 434 each begin to self-heat. As the ATS 434 is assumed to be supported in the ambient environment (i.e., air), and that the TLS 414 is at least partially contacted with the imaging media (not shown), the ATS 434 is generally warming toward a higher steady-state temperature than that of the TLS 414 (by virtue of thermal energy loss to the contacting imaging media). In accordance with the thermal coefficients of each, a greater level of imaging media in contact with the TLS 414 generally results in a greater difference between the signal levels provided by the TLS 414 and the ATS 434, respectively. To clarify, the greater the difference signal between the nodes A' and B', the generally greater is the level of imaging media in contact with the TLS 414.

At some predetermined time after the issuance of the first signal—during a later portion of the applied electrical pulses—the pulse control 428 issues a second signal to the signal processor 422. In response, the signal processor 422 samples the difference signal value (i.e., voltage) present between nodes A' and B' of the bridge circuit 436. In accordance with the sampled signal value, the signal processor 422 provides a media level signal to the requestor generally corresponding to the level (i.e., quantity) of media detected by the TLS 414.

Thereafter, the pulse control 428 signals the first current source 430 and the second current source 431 to end the application of electrical current to the TLS 414 and ATS 434, respectively, thus ending the presently applied electrical pulses. In response, the ATS 434 and the TLS 414 begin to cool back toward the ambient temperature. A single operation, or iteration, of the sensor circuitry 412 is considered complete.

The sensor circuitry 412, in cooperation with the TLS 414, provides a media level signal (or message) to a requesting entity (such as an imaging apparatus controller, or user computer) corresponding to the quantity of imaging media presently within the sensed reservoir or cartridge. Furthermore, the sensor circuitry 412 is generally configured to do so by substantially direct detection of the difference signal (or voltage) provided by the bridge circuit 436.

Figure 6:
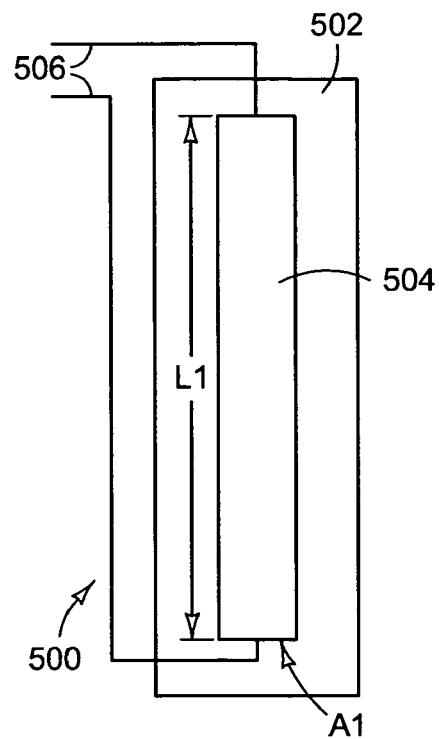
FIG. 6 is a front elevation view depicting a thermistor level sensor in accordance with still another embodiment of the present invention.

FIG. 6 is a front elevation view depicting a thermistor level sensor 500 in accordance with still another embodiment of the present invention. The thermistor level sensor (hereafter, TLS) 500 includes a substrate 502. The substrate 502 can be defined by any suitable substantially non-electrically conductive material, which also exhibits a relatively low thermal mass. Non-limiting examples of such a substrate 502 material include glass, plastic, low-thermal-mass ceramic, etc. Other materials can also be used. The substrate 502 generally defines a strip of material of relatively slight thickness.

The TLS 500 also includes a thermistor material 504. The thermistor material 504 is supported by the substrate 502. The thermistor material 504 can be generally defined by any suitable such material which includes a usable temperature (i.e., electrical resistance-to-temperature) coefficient. Generally, the thermistor material 504 is selected to define a positive or negative temperature coefficient. The thermistor material 504 can include, for example, barium titanate. Other thermistor materials 504 can also be used. As depicted in FIG. 6, the thermistor material 504 substantially defines a strip of material including a lengthwise dimension or portion "L1" and a generally constant cross-sectional area "A1".

The TLS 500 further includes a pair of lead wires 506. The lead wires 506 can be formed from any suitable electrically conductive material such as, for example, copper, silver, gold, etc. Other materials can also be used to form the lead wires 506. Each of the lead wires 506 is electrically coupled to an opposite end of the thermistor material 504. In this way, the lead wires 506 permit electrically coupling the electrical resistance provided by the thermistor material 504 to an outside entity (such as, for example, the sensor circuitry 112 of FIG. 1).

Typical operation of the TLS 500 is as follows: the TLS 500 is supported such that the lengthwise portion L1 of the thermistor material 504 is in contact with some level (quantity) of imaging media (not shown; see the imaging media 108 of FIG. 1). The TLS 500 is then electrically energized by an external source (not shown; see the sensor circuitry 112 of FIG. 1) coupled to the TLS 500 by way of the lead wires 506, typically in the form of a pulse of substantially constant-magnitude electrical current.

In response to the electrical energization, the thermistor material 504 begins to self-heat (i.e., generate heat) towards a steady-state temperature in excess of the ambient temperature thereabout. A portion of the heat generated by the thermistor material 504 is thermally coupled (i.e., transferred) to the imaging media (not shown) in contact with the lengthwise portion L1 of the thermistor material 504.

After some period of time the TLS 500 reaches a steady-state temperature. This steady-state temperature is substantially determined by the ambient temperature of the TLS 500 and the level of imaging media (not shown) in contact therewith. Due to the temperature coefficient of the thermistor material 504, the TLS 500 provides an electrical resistance corresponding to the steady-state temperature now present.

The electrical resistance provided by the TLS 500—now substantially at steady-state temperature—is present as a voltage (i.e., level signal) between the two lead wires 506 by virtue of the applied pulse of electrical current. This level signal is then sampled (detected) by an exterior entity (not shown; see the sensor circuitry 112 of FIG. 1) and a suitable media level signal is derived therefrom representative of the level of the imaging media (not shown) in contact with the TLS 500. At this time, the external source typically de-energizes the TLS 500, permitting it to cool back toward ambient temperature. A single use of the TLS 500 is now generally considered complete.

The media level signal derivation process can include, for example, a comparison of the level signal with an ambient temperature signal (i.e., a difference signal), the cross-referencing of lookup tables in computer-accessible memory, direct conversion by way of a state-machine, etc., in accordance with the present invention and substantially as described above in regard to the sensor circuitry 112 of FIG. 1, the sensor circuitry 312 of FIG. 3, or the sensor circuitry 412 of FIG. 5.

It is important to note that the TLS 500 of FIG. 6 includes a thermistor material 504 defining a substantially constant cross-sectional area A1 along the lengthwise dimension L1 thereof. As a result, the TLS 500 exhibits generally the same sensitivity or level signal resolution at all levels of an imaging media (not shown) in contact therewith. However, it is sometimes desirable to increase the signal resolution at certain areas within the level measurement range, relative to that of other such areas. Typically, the area of greatest level measurement interest (i.e., concern) occurs when the imaging media in contact with a thermistor level sensor of the present invention is approaching or within a generally low level. Devices in accordance with the present inventions are described hereafter that address this level signal resolution issue.

Figure 6A:
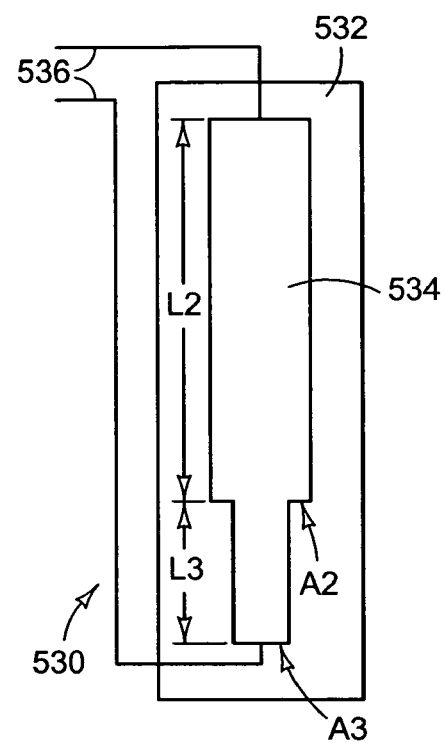
FIG. 6A is front elevation view depicting a thermistor level sensor in accordance with another embodiment of the present invention.

FIG. 6A is a front elevation view depicting a thermistor level sensor (hereafter, TLS) 530 in accordance with another embodiment of the present invention. The TLS 530 includes a substrate 532 and a pair of lead wires 536 that are defined, configured and cooperative substantially as described above in regard to the substrate 502 and the pair of lead wires 506, respectively, of the TLS 500 of FIG. 6.

Also the TLS 530 includes a thermistor material 534. The thermistor material 534 is supported by the substrate 532, and can be defined by any suitable such thermistor material such as, for example, barium titanate. Other suitable thermistor materials can also be used. The thermistor material 534 defines a generally upper lengthwise portion "L2" including a generally constant cross-sectional area "A2". Furthermore, the thermistor material 534 also defines a generally lower lengthwise portion "L3" including a generally constant cross-sectional area "A3". It is to be noted that the cross-sectional area A3 is generally less than the cross-sectional area A2.

In this way, the TLS 530 provides a level signal that exhibits increased signal resolution corresponding to a measured level of imaging media (not shown) in contact with the lower lengthwise portion L3, relative to the signal resolution corresponding to the upper lengthwise portion L2. That is, the resolution of the level signal in units of, for example, volts-per-centimeter of measured imaging media is greater for the lower lengthwise portion L3 than for that of the upper lengthwise portion L2 of the thermistor material 534. Thus, a greater sensitivity to lower levels of imaging media (not shown; see the imaging media 108 of FIG. 1) is provided by the TLS 530 relative to that of the TLS 500 of FIG. 6. The increased signal resolution notwithstanding, typical operation of the TLS 530 is substantially the same as that described above in regard to the TLS 500 of FIG. 6.

Figure 6B:
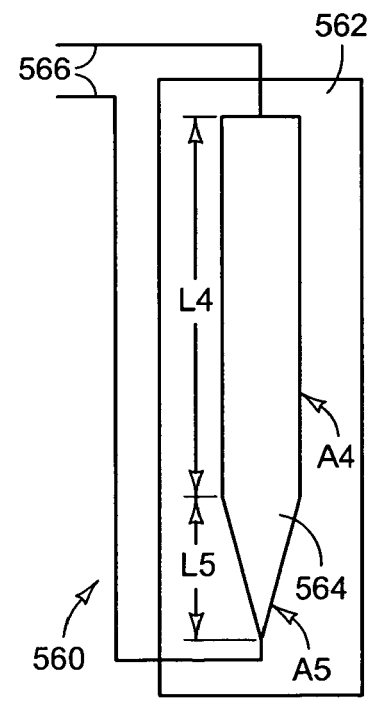
FIG. 6B is a front elevation view depicting a thermistor level sensor in accordance with yet another embodiment of the present invention.

FIG. 6B is a front elevation view depicting a thermistor level sensor (hereafter, TLS) 560 in accordance with yet another embodiment of the present invention. The TLS 560 includes a substrate 562 and a pair of lead wires 566 that are substantially defined, configured and cooperative as described above in regard to the substrate 502 and the pair of lead wires 506, respectively, of the TLS 500 of FIG. 6.

The TLS 560 also includes a thermistor material 564. The thermistor material 564 can be formed from any suitable thermistor material such as, for example, barium titanate. Other suitable thermistor materials can also be used. The thermistor material 564 defines a generally upper lengthwise portion "L4" including a substantially constant cross-sectional area "A4". The thermistor material also defines a generally lower lengthwise portion "L5" including a lengthwise varying cross-sectional area "A5". As depicted in FIG. 6B, the cross-sectional area A5 of the lower lengthwise portion L5 of the thermistor material 564 is configured such that a substantially linear taper away from the upper portion L4 is defined. Other embodiments of the thermistor material 564 (not shown) defining other lower portions L5 including correspondingly varying cross-sectional areas A5 (i.e., overall geometries) can also be used.

In any case, the TLS 560 provides a level signal that exhibits a generally constant signal resolution (i.e., volts-per-centimeter of contacting imaging media) over the upper portion L4 while exhibiting a substantially increasing signal resolution within the lower portion L5, as imaging media (not shown) in contact with the TLS 560 is decreased. Thus, the TLS 560 exhibits increased sensitivity for imaging media (not shown) in contact with the lower lengthwise portion L5 of the thermistor material 564. Aside from the increased signal resolution, the typical operation of the TLS 560 is substantially the same as that described above in regard to the TLS 500 of FIG. 6.

Figure 6C:
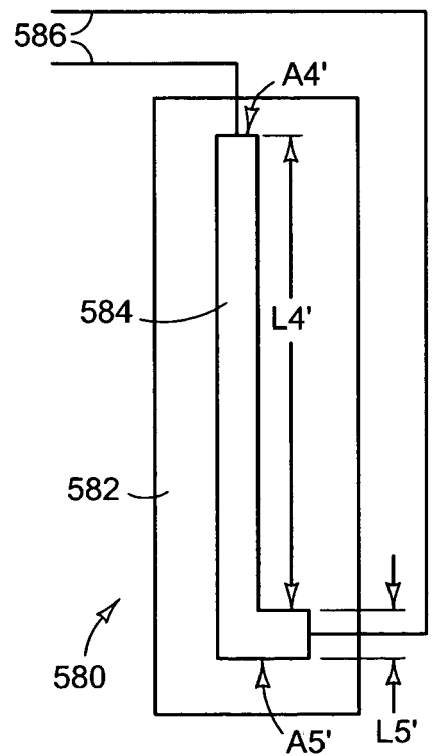
FIG. 6C is a front elevation view depicting a thermistor level sensor in accordance with another embodiment of the present invention.

FIG. 6C is a front elevation view depicting a thermistor level sensor (hereafter, TLS) 580 in accordance with yet another embodiment of the present invention. The TLS 580 includes a substrate 582 and a pair of lead wires 586 that are substantially defined, configured and cooperative as described above in regard to the substrate 502 and the pair of lead wires 506, respectively, of the TLS 500 of FIG. 6.

The TLS 580 also includes a thermistor material 584. The thermistor material 584 can be formed from any suitable thermistor material such as, for example, barium titanate. Other suitable thermistor materials can also be used. The thermistor material 584 defines a generally upper lengthwise portion "L4'" including a substantially constant cross-sectional area "A4'". The thermistor material 584 also defines a generally lower lengthwise portion "L5'" including a substantially constant cross-sectional area "A5'".

As depicted in FIG. 6C, the lower lengthwise portion L5' extends generally perpendicularly away from the upper lengthwise portion L4', such that the thermistor material 584 defines a substantially L-shaped configuration supported on the substrate 582. In this way, the TLS 580 provides a level signal that exhibits a first signal resolution (i.e., volts-per-centimeter of contacting imaging media) over the upper portion L4', while exhibiting a substantially increased second signal resolution within the lower portion L5', as imaging media (not shown) in contact with the TLS 580 is decreased. Thus, the TLS 580 exhibits increased sensitivity for imaging media (not shown) in contact with the lower lengthwise portion L5' of the thermistor material 584. Aside from the increased signal resolution, the typical operation of the TLS 580 is substantially the same as that described above in regard to the TLS 500 of FIG. 6.

Figure 7:
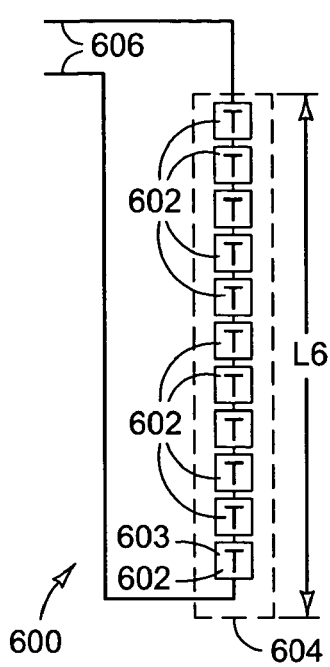
FIG. 7 is a side elevation schematic depicting a thermistor level sensor in accordance with still another embodiment of the present invention.

FIG. 7 is a side elevation schematic view depicting a thermistor level sensor (hereafter, TLS) 600 in accordance with still another embodiment of the present invention. The TLS 600 includes a plurality of discrete thermistors 602. Each of the thermistors 602 can be defined by any suitable thermistor device usable in accordance with the present invention.

In one embodiment, the thermistors 602 have substantially equal temperature coefficients. In another embodiment, one or more of the generally lower thermistors 602 (exemplified as thermistor 603 in FIG. 7) has a temperature coefficient that is substantially different from that of the other thermistors 602 of the TLS 600, such that an increased signal resolution is provided during detection (i.e., measurement) of relatively low levels of imaging media (not shown). One of skill in the electronic instrumentation arts is aware of a number of suitable such thermistors 602 and further elaboration is not required for purposes of understanding the present invention.

As depicted in FIG. 7, the thermistors 602 are mutually electrically coupled so as to define a series circuit or linear array 604 including a lengthwise portion "L6". Furthermore, the TLS 600 includes a pair of lead wires 606 that are respectively electrically coupled to substantially end-most thermistors 602 of the array 604. The lead wires 606 provided for electrically coupling the TLS 600 to an external circuit and/or energy source (not shown; see the sensor circuit 112 of FIG. 1) during typical use (described in detail hereafter).

Typical operation of the TLS 600 is generally as follows: the TLS 600 is electrically coupled to a suitable external sensor circuitry (e.g., the sensor circuitry 112 of FIG. 1) by way of the lead wires 606 and the TLS 600 is supported so that the lengthwise portion L6 of the array 604 is in contact with an imaging media (not shown) to be measured.

The external sensor circuit (not shown) then energizes the TLS 600 with a suitable pulse of electrical current. In response, each of the thermistors 602 begins to self-heat. Those thermistors 602 that are in contact (or partial contact) with the imaging media transfer a portion of their heat energy thereto and, as a result, tend to remain cooler than those thermistors 602 that are in contact with the ambient media (i.e., air). The TLS 600 approaches an overall—steady state condition and provides a level signal (voltage) corresponding to the level of imaging media (e.g., imaging media 108 of FIG. 1) in contact with the lengthwise portion L6 of the TLS 600.

Thereafter, the external sensor circuitry (not shown) samples the level signal voltage for purposes of providing a media level signal in accordance with the present invention. The external sensor circuitry then de-energizes the TLS 600, effectively halting the applied pulse of electrical current. The thermistors 602 of the TLS 600 generally begin to cool. A single operation of the TLS 600 is thus considered complete.

Figure 8:
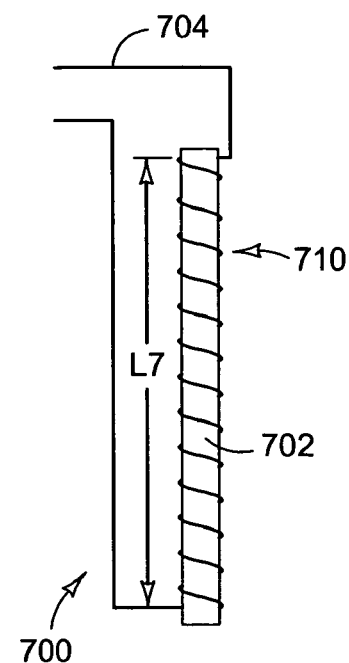
FIG. 8 is side elevation view depicting a thermistor level sensor in accordance with another embodiment of the present invention.

FIG. 8 is a side elevation view depicting a thermistor level sensor (hereafter, TLS) 700 in accordance with another embodiment of the present invention. The TLS 700 includes a mandrel 702. As depicted in FIG. 8, the mandrel 702 generally defines a cylindrical rod. Other geometries of mandrel 702 can also be used. The mandrel 702 can be formed from any suitable, electrically non-conductive material of relatively low thermal mass. Non-limiting examples of such a material include capton, plastic, etc. Other suitable materials can also be used.

The TLS 700 also includes a thermistor wire 704. The thermistor wire 704 can be formed from any suitable thermistor material that includes a generally suitable temperature coefficient (i.e., electrical resistance-to-temperature correlation). In one embodiment, the thermistor wire 704 is formed from tungsten. Other thermistor materials can also be used. While tungsten exhibits a positive temperature coefficient, materials of positive or negative temperature coefficients can be used. The thermistor wire 704 is generally wound about (i.e., supported by) the mandrel 702 such that a helix 710 is defined including a lengthwise portion (or aspect) "L7".

Typical operation of the TLS 700 is as follows: the TLS 700 is supported so that a level of an imaging media (not shown) is in contact with the lengthwise portion L7 of the TLS 700. Then, an electrical current is applied to the thermistor wire 704 of the TLS 700 by an external sensor circuitry (not shown), resulting in a self-heating of the thermistor wire 704. A portion of the heat energy thus generated is transferred to the imaging media and a steady-state temperature condition is eventually achieved.

A voltage level signal is present across the TLS 700 corresponding to the level of imaging media in contact therewith. This level signal is sensed (sampled) by the external sensor circuitry and used or processed to provide a media level signal in accordance with the level of the imagined media sensed by (in contact with) the lengthwise portion L7 of the TLS 700. The applied pulse of electrical current is then ended, and the TLS 700 cools toward ambient temperature. A single, general operation of the TLS 700 is now considered c omplete.

Figure 8A:
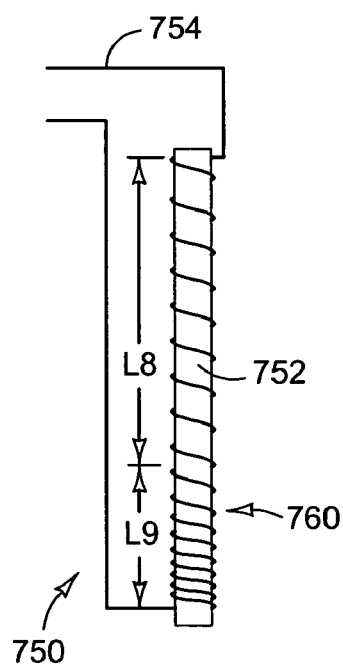
FIG. 8A is a side elevation view depicting a thermistor level sensor in accordance with yet another embodiment of the present invention.

FIG. 8A is a side elevation view depicting a thermistor level sensor (hereafter, TLS) 750 in accordance with another embodiment of the present invention. The TLS 750 includes a mandrel 752. The mandrel 752 is defined, configured and cooperative substantially as described above in regard to the mandrel 702 of the TLS 700 of FIG. 8.

The TLS 750 also includes a thermistor wire 754. The thermistor wire 754 can be formed from any suitable thermistor material such as, for example, tungsten. Other thermistor materials can also be used. The thermistor wire 754 is generally wound about and supported by the mandrel 752 such that a helix 760 is defined. The helix 760 includes a generally upper lengthwise portion "L8" and a generally lower lengthwise portion "L9". As depicted in FIG. 8A, the lower portion L9 of the helix 760 includes a substantially different pitch (i.e., turns-per-centimeter length) about the mandrel 752, than that of the upper portion L8.

In this way, the TLS 750 provides an increased level signal resolution corresponding to an imaging media (not shown) in contact with the lower portion L9, relative to the signal resolution for that imaging media in contact with the upper portion L8. Thus, the TLS 750 provides increased sensitivity when measuring relatively low levels of imaging media. The increased signal resolution notwithstanding, typical operation of the TLS 750 is substantially the same as that described above in regard to the TLS 700 of FIG. 8.

Figure 9:
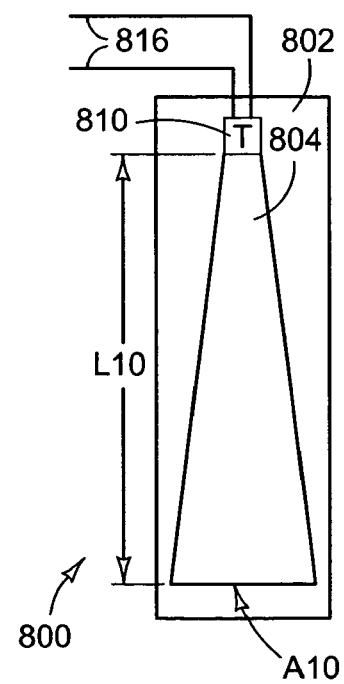
FIG. 9 is a front elevation view depicting a thermistor level sensor in accordance with still another embodiment of the present invention.

FIG. 9 is a front elevation view depicting a thermistor level sensor (hereafter, TLS) 800 in accordance with still another embodiment of the present invention. The TLS 800 includes a substrate 802. The substrate 802 can be formed from any suitable electrically non-conductive material that also exhibits relatively low thermal mass. Non-limiting examples include plastic, glass, some ceramics, etc. Other materials can also be used.

The TLS 800 also includes a thermal radiator 804. The thermal radiator 804 is supported by the substrate 802 and defines a lengthwise portion "L10". As depicted in FIG. 9, the lengthwise portion L10 includes a lengthwise varying cross-sectional area "A10". In this way, the thermal radiator 804 defines a generally triangular shape supported on the substrate 802. Other geometries (not shown) of thermal radiator can also be used. The thermal radiator 804 can be formed from any suitable substantially heat conductive material such as, for example, copper, aluminum, etc. Other materials can also be used to form the thermal radiator 804.

The TLS 800 further includes a thermistor 810. The thermistor 810 is generally supported by the substrate 802 and is thermally coupled to the thermal radiator 804 at a generally upper end thereof. The thermistor 810 can be defined by any suitable thermistor in accordance with the present invention. The thermistor 810 includes a pair of lead wires 816 that are configured to permit electrically coupling the thermistor 810 to a suitable external sensor circuitry (not shown; see the sensor circuitry 112 of FIG. 1).

Typical operation of the TLS 800 is as follows: the TLS 800 is assumed to be coupled to suitable sensor circuitry of the present invention, such as, for example, the sensor circuitry 112 of FIG. 1. The TLS 800 is also assumed to be supported such that a level of imaging media (not shown; see imaging media 108 of FIG. 1) is in contact with the lengthwise portion L10 of the TLS 800.

Next, the sensor circuitry (not shown) applies a pulse of electrical current to the TLS 800 by way of the lead wires 816. In response, the thermistor 810 begins to self-heat. A substantial portion of the heat energy generated by the thermistor 810 is thermally conducted to the thermal radiator 804. In turn, the thermal radiator 804 transfers some portion of the thermal energy received from the thermistor 810 to the imaging media (not shown) in contact therewith. Generally, the greater the level of imaging media in contact with the lengthwise portion L1 of the thermal radiator 804, the cooler the thermal radiator 804 will be once a steady-state condition is reached.

At some time after the onset of the applied pulse of electrical current, the external sensor circuitry (not shown) samples the voltage (level signal) present between the lead wires 816. This sampling is assumed to be performed at or before a substantially steady-state thermal condition of the TLS 800 is realized. The level signal present between the lead wires 816 corresponds to the level of imaging media in contact with the lengthwise portion L10 of the thermal radiator 804. The sensor circuitry (not shown) then provides a media level signal in accordance with the level signal, and generally thereafter halts the applied pulse of electrical current to the TLS 800, which responds by cooling back toward ambient temperature. A single operation of the TLS 800 is now considered complete.

As described above, the thermal radiator 804 of the TLS 800 is generally triangular in shape, such that the generally lower portion of the thermal radiator 804 is wider than the generally upper portion. In this way, the general bulk of the thermal energy is transferred to the imaging media (not shown) in contact with the lower (i.e., flared) portion of the thermal radiator 804. The overall result is that the TLS 800 exhibits increased signal resolution with respect to generally lower level of imaging media in contact with the thermal radiator 804. As described above, other geometries of thermal radiator 804 can be formed, resulting in varying signal resolutions corresponding to different lengthwise areas of the thermal radiator 804.

Figure 10:
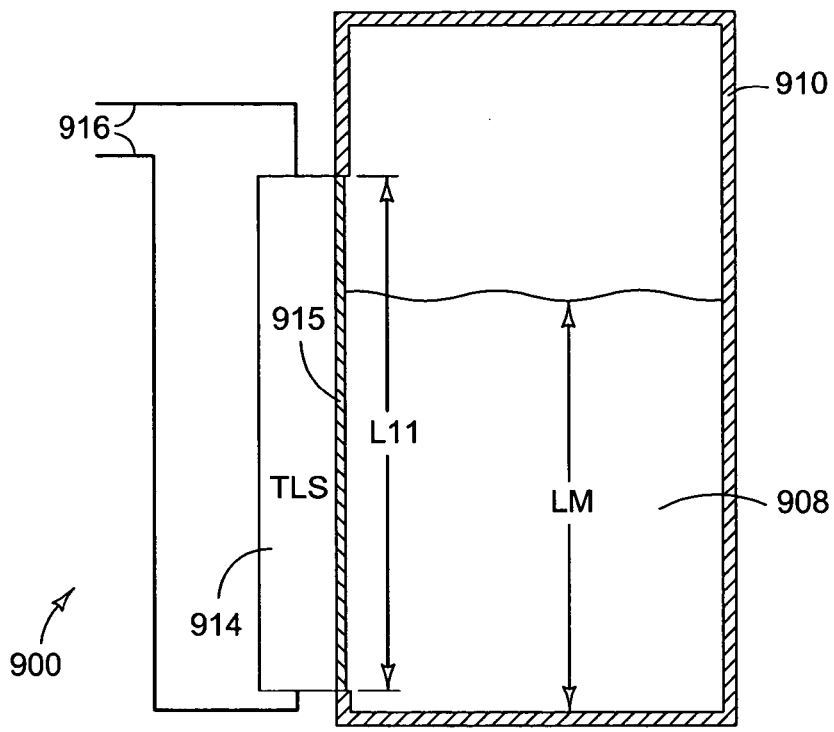
FIG. 10 is a side elevation sectional view depicting a thermistor level sensor in accordance with another embodiment of the present invention.

FIG. 10 is a side elevation sectional view depicting a thermistor level sensor (hereafter, TLS) 914 in accordance with another embodiment of the present invention. The TLS 914 can include any suitable thermistor level sensor in accordance with the present invention. In one embodiment (not shown), the TLS 914 includes the thermistor level sensor 500 of FIG. 6. In another embodiment (not shown), the TLS 914 includes the thermistor level sensor 600 of FIG. 7. Other embodiments (not shown) of TLS 914 including other thermistor level sensor can also be used.

In any case, the TLS 914 also includes a thermal window 915. The thermal window 915 defines a lengthwise portion "L11" of the TLS 914. As depicted in FIG. 10, the thermal window 915 is configured to thermally couple the TLS 914 with an imaging media 908 supported within a reservoir 910. In this way, the TLS 914 is supported substantially exterior to the inside of the reservoir 910. The thermal window 915 is typically formed from any relatively thin, smooth, thermally conductive material. Non-limiting examples of such thermal window 915 material include plastic, capton, copper, aluminum, etc. Other materials can also be used.

The TLS 914 also includes a pair of lead wires 916 configured to electrically couple the TLS 914 with a suitable external sensor circuitry (not shown; see the sensor circuitry 112 of FIG. 1).

Typical operation of the TLS 914 is as follows: a pulse of electrical current is applied to the TLS 914 by way of a sensor circuitry (not shown) suitably coupled to the lead wires 916. In response, the TLS 914 begins to self-heat, with a portion of the correspondingly generated thermal energy being transferred to the imaging media 908 by way of contact with the thermal window 915.

The TLS 914 eventually reaches a thermal steady-state condition at a temperature generally higher than ambient, and in accordance with the level "LM" of imaging media 908 in contact with the lengthwise portion L11 of the TLS 914. At this point, a level signal (voltage) corresponding to the level LM of the imaging media 908 in contact with the thermal window 915. The sensor circuit (not shown) then samples this level signal for purposes (typically) of providing a media level signal.

The sensor circuitry (not shown) then halts the pulse of electrical current to the TLS 914. The TLS 914 responds by cooling generally toward ambient temperature. A single operation of the TLS 914 is now complete.

As described above, the thermal window 915 provides for thermal communication between the TLS 914 and the imaging media 908 whose level LM is to be measured. Thus, the thermal window 915 provides for a smooth form of shielding or mechanical buffering between the TLS 914 and the imaging media 908. In this way, the imaging media 908 tends to readily slough off of the thermal window 915 as the imaging media 908 is consumed (i.e., used in by an associated imagined apparatus, not shown) and does not generally accumulate, or clump, on the thermal window 915, thus reducing the likelihood of false measurements (i.e., erroneous level signals) provided by the TLS 914 during operation.

Figure 11:
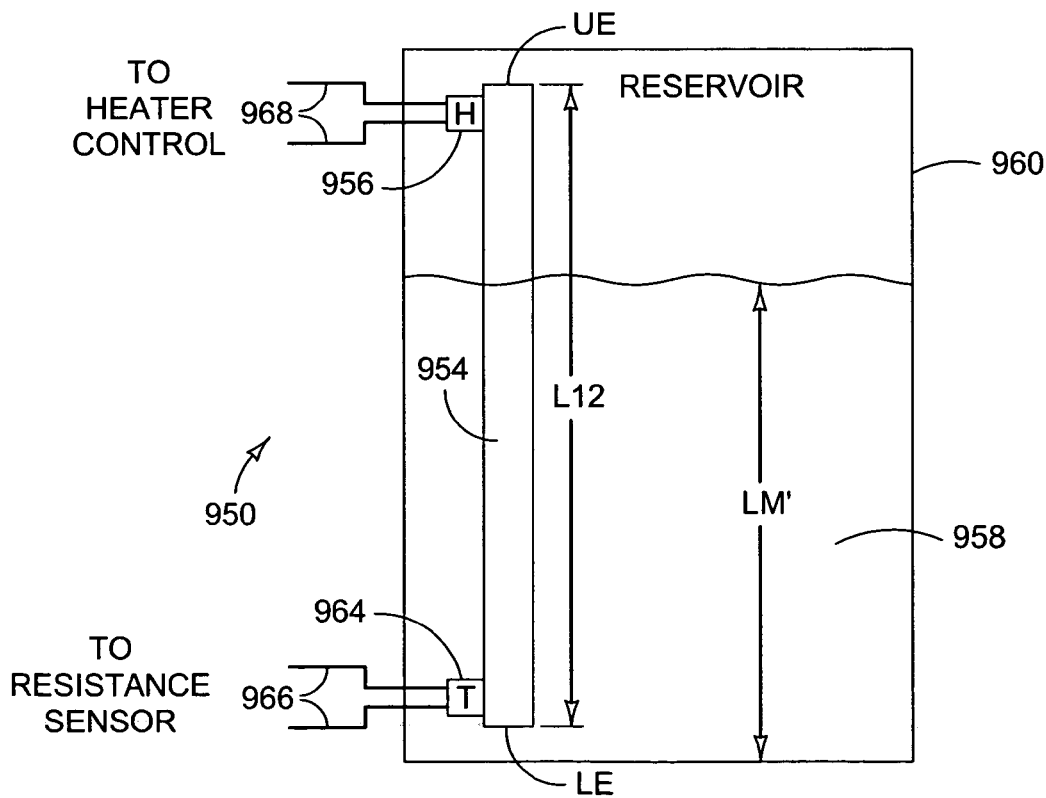
FIG. 11 is a side elevation sectional view depicting a thermistor level sensor in accordance with yet another embodiment of the present invention.

FIG. 11 is a side elevation sectional view depicting a thermistor level sensor (hereafter, TLS) 950 in accordance with yet another embodiment of the present invention. The TLS 950 includes a thermal conductor 954. The thermal conductor 954 can be formed from any suitable thermally conductive material such as, for example, copper aluminum, etc. Other materials can also be used. The thermal conductor 954 can further be formed in any of a number of suitable geometries. As depicted in FIG. 11, the thermal conductor 954 generally defines a cylindrical rod. In any case, the thermal conductor defines a lengthwise portion "L12" of the TLS 950.

The TLS 950 also includes a thermistor 964. The thermistor 964 is thermally coupled to a generally lower end "LE" of the thermal conductor 954. The thermistor can be defined by any suitable thermistor. One of skill in the electronic arts can appreciate that a number of such thermistors 964 can be used and that further elaboration is not required for purposes herein. The thermistor 964 includes a pair of temperature sense leads 966 configured to electrically couple the thermistor 964 to a suitable sensor circuitry (not shown; see the sensor circuitry 112 of FIG. 1).

The TLS 950 also includes an electric heater 956. The electric heater 956 is thermally coupled to a generally upper end "UE" of the thermal conductor 954. The electric heater 956 can be defined by any suitable electric heating element consistent with the present invention. In one embodiment, the electric heater 956 is substantially equivalent to the thermistor 964. Other electric heaters 956 can also be used. The electric heater 956 includes a pair of heater leads 968 configured to electrically couple the electric heater 956 to a suitable source of electrical energy such as, for example, the sensor circuitry 112 of FIG. 1, or the current source 330 of FIG. 3.

As depicted in FIG. 11, the thermal conductor 954 is generally supported within a reservoir 960 containing (i.e., supporting) an imaging media 958. A level "LM'" of the imaging media 958 is in contact with the lengthwise portion L12 of the TLS 950.

Typical operation of the TLS 950 is as follows: a pulse of electrical current is applied to the electric heater 956 by an external source (not shown) by way of the heater leads 968. In response, the electric heater 956 begins to generate thermal energy that is transferred in substantial portion to the thermal conductor 954. In turn, the thermal conductor 954 conducts this thermal energy generally away from the upper end UE toward the thermistor 964 at the lower end LE.

As the thermal conductor 954 conducts the thermal energy, a portion is thermally transferred to the imaging media 958 that is in contact with the thermal conductor 954. As a result, the thermal conductor 954 generally warms toward a steady-state temperature in accordance with the level LM' of imaging media 958 in contact therewith. Generally speaking, the greater is the level LM' of imaging media 958, the relatively lower will be the eventual steady-state temperature of the thermal conductor 954. The thermistor 964 provides an electrical resistance (i.e., level signal) corresponding to the temperature of the lower end of the thermal conductor 954.

At some time at or before a steady-state thermal condition of the thermal conductor 954, a sensor circuitry (not shown) coupled to the thermistor 964 by way of the temperature sense leads 966 samples the electrical resistance (level signal) thereof. The sensor circuit then typically derives a media level signal corresponding to the level LM' of the imaging media 958 within the reservoir 960 from the sampled level signal. At this time, the external source (not shown) is assumed to halt the pulse of electrical current to the electric heater 956, and the TLS 950 as a whole is considered to cool toward ambient temperature. A single operation of the TLS 950 is now considered complete.

Thus, the TLS 950 provides for a level signal corresponding to—and thus a general measurement of—the level LM' of the imaging media 958 within the reservoir 960.

Figure 12:
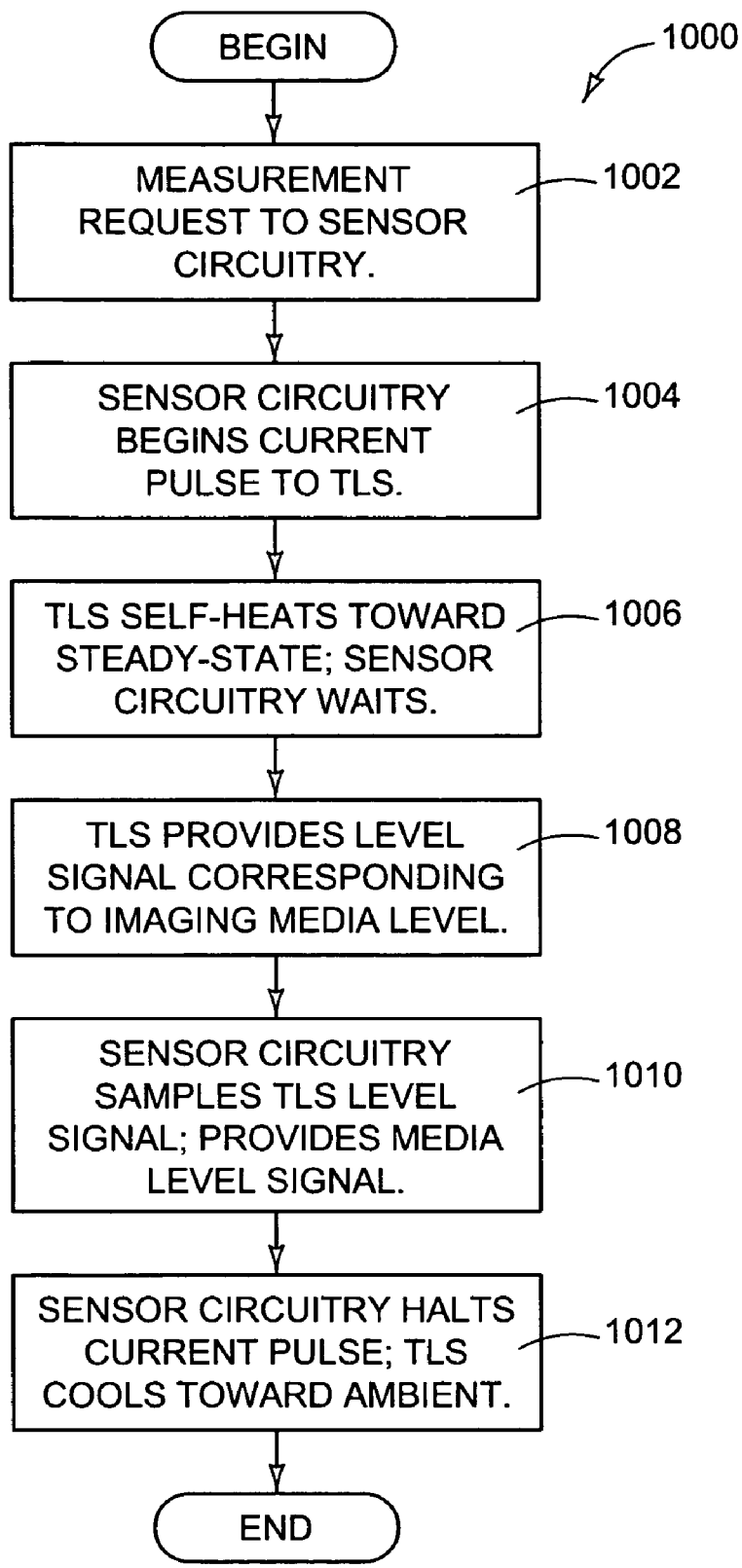
FIG. 12 is a flowchart depicting a method in accordance with another embodiment of the present invention.

FIG. 12 is a flowchart depicting a method 1000 in accordance with the present invention. It is to be understood that while the method 1000 describes particular steps and order of execution, other embodiments of the present invention respectively describing other methods and order of execution can also be used. For clarity of understanding, the method 1000 is described in the context of the imaging system 100 of FIG. 1. It is to be further understood that the method 1000 and/or its appropriate variations can also be applied to level measurements other than imaging media (e.g., pharmaceuticals, industrial material processing, etc.).

In step 1002 (FIG. 12), the controller 104 (FIG. 1) issues a measurement signal requesting that the sensor circuitry 112 provide a media level signal representing the quantity of the imaging media 108 within the reservoir 110.

In step 1004 (FIG. 12), the sensor circuitry 112 (FIG. 1) responds by initiating a pulse of substantially constant-magnitude electrical current to the thermistor level sensor (TLS) 114.

In step 1006 (FIG. 12), the TLS 114 (FIG. 1) responds to the electrical current by beginning to generate heat, warming the TLS 114 toward a substantially steady-state temperature. The sensor circuitry 112 waits during a predetermined initial portion of the applied pulse of electrical current.

In step 1008 (FIG. 12), TLS 114 (FIG. 1), at or before a steady-state thermal condition, provides a level signal (voltage) corresponding to the level L of imaging media 108 in contact therewith.

In step 1010 (FIG. 12), the sensor circuitry 112 (FIG. 1) samples the level signal (voltage) provided by the TLS 114 and derives a media level signal representing the quantity of imaging media 108 within the reservoir 110 for communication to the controller 104.

In step 1012 (FIG. 12), the sensor circuitry 112 (FIG. 1) ends (i.e., halts) the pulse of electrical current being provided to the TLS 114. In response, the TLS 114 cools substantially toward ambient temperature. A single operation (or iteration) of the method 1000 is generally considered complete.

While the various embodiments of the present invention described above are generally presented within the context of sensing (i.e., detecting, or measuring) imaging media as used with an imaging apparatus (for example, the imaging media 108 of the imaging apparatus 102 of FIG. 1), it is to be understood that embodiments of the present invention can also be used in a number of other suitable applications such as, for example, measurement of material (media) levels in tanks or vats (e.g., chemicals, powdered compounds, petroleum, pharmaceuticals, etc.), or the level of a flowing media within an open or closed conduit (e.g., weirs, troughs, pipes, etc.).

In the case of a flowing material (i.e, media such as, for example, ink), a suitable thermistor level sensor (e.g., TLS 114, 314, 414, etc.) can be energized using a substantially constant electrical current—that is, the thermistor level sensor (not shown) can be continuously electrically energized for an indefinite period of time. Thus, the use of a pulse of electrical current (e.g., electrical pulse 202 of FIG. 2) would be optional in such a circumstance. Other embodiments (not shown) of the present invention suitable for use in other applications can also be used. In any case, each of the sensor circuits of the present invention (e.g., sensor circuitry 112, 312, 412, etc.) is generally configured to limit (or control) the electrical current being provided to an associated thermistor level sensor (e.g., TLS 114, 314, 414, etc.) so as to substantially prevent heat related damage to the imaging media being measured or detected.

While the above methods and apparatus have been described in language more or less specific as to structural and methodical features, it is to be understood, however, that they are not limited to the specific features shown and described, since the means herein disclosed comprise preferred forms of putting the invention into effect. The methods and apparatus are, therefore, claimed in any of their forms or modifications within the proper scope of the appended claims appropriately interpreted in accordance with the doctrine of equivalents.

We claim:

1. A level measurement apparatus, comprising:
   a microcontroller including an executable program code and a plurality of lookup tables, each of the lockup tables including level data, the program code configured to cause the microcontroller to:
   provide a trigger signal;
   sense a level signal at a predetermined time after providing the trigger signal;
   sense an ambient temperature signal;
   cross-reference a particular one of the plurality of lockup tables corresponding to the ambient temperature signal;
   cross-reference particular level data within the particular lockup table corresponding to the level signal; and
   provide an imaging media level signal in accordance with the particular data.

2. The level measurement apparatus of claim 1, and further camprising an electrical source electrically coupled to the microcontroller and configured to provide a pulse of electrical current in response to the trigger signal.

3. The level measurement apparatus of claim 1, and further comprising an ambient temperature sensor electrically coupled to the microcontroller and configured to provide the ambient temperature signal.

4. The level measurement apparatus of claim 1, and wherein each of the plurality of lookup tables includes a plurality of data records, each data record including:
   a predetermined range of values of the level signal; and
   the level data representing an imaging media level corresponding to the predetermined range of values.

5. The level measurement apparatus of claim 1, and further comprising a thermistor device electrically coupled to the microcontroller and configured to provide the level signal in correspondence to a level of an imaging media in contact with a lengthwise portion of the thermistor device during a pulse of electrical current applied to the thermistor device.

6. The level measurement apparatus of claim 5, and wherein the thermistor device is further configured to be supported such that the lengthwise portion extends along a majority of a depth-wise dimension of an imaging media reservoir.

7. The level measurement apparatus of claim 5, and wherein the thermistor is further configured such that the level signal includes a varying resolution correspondIng to the level of the imaging media in contact with the thermistor device.

* * * * *

UNITED STATES PATENT AND TRADEMARK OFFICE
CERTIFICATE OF CORRECTION

PATENT NO. : 7,146,854 B2
APPLICATION NO. : 11/192702
DATED : December 12, 2006
INVENTOR(S) : Gerard J. Carlson et al.

Page 1 of 1

It is certified that error appears in the above-identified patent and that said Letters Patent is hereby corrected as shown below:

In column 17, line 29, after "portion" delele "L1" and insert -- L10 --, therefor.

In column 20, line 62, delete "corn prise" and insert -- comprise --, therefor.

In column 21, line 4, in Claim 1, delete "lockup" and insert -- lookup --, therefor.

In column 21, line 11, in Claim 1, delete "lockup" and insert -- lookup --, therefor.

In column 21, line 14, in Claim 1, delete "lockup" and insert -- lookup --, therefor.

In column 21, line 19, in Claim 2, delete "camprising" and insert -- comprising --, therefor.

In column 22, line 21, in Claim 7, delete "correspondlng" and insert -- corresponding --, therefor.

Signed and Sealed this

Second Day of December, 2008

JON W. DUDAS
*Director of the United States Patent and Trademark Office*